(12) United States Patent
Yi

(10) Patent No.: US 12,554,118 B2
(45) Date of Patent: Feb. 17, 2026

(54) IMAGING DEVICE COMPRISING A DRIVING MECHANISM CONNECTED TO A FILTER ASSEMBLY AND ELECTRONIC EQUIPMENT HAVING THE SAME

(71) Applicant: TRIPLE WIN TECHNOLOGY(SHENZHEN) CO.LTD., Shenzhen (CN)

(72) Inventor: Wen-Jie Yi, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 331 days.

(21) Appl. No.: 18/373,027

(22) Filed: Sep. 26, 2023

(65) Prior Publication Data

US 2025/0067970 A1 Feb. 27, 2025

(30) Foreign Application Priority Data

Aug. 21, 2023 (CN) .......................... 202322256359.2

(51) Int. Cl.
G02B 26/00 (2006.01)
H04N 23/51 (2023.01)

(52) U.S. Cl.
CPC ........... *G02B 26/007* (2013.01); *H04N 23/51* (2023.01)

(58) Field of Classification Search
CPC .................................................. G02B 26/007
See application file for complete search history.

(56) References Cited

U.S. PATENT DOCUMENTS

| | | | |
|---|---|---|---|
| 2019/0227199 A1* | 7/2019 | Kao ....................... | G06F 1/1626 |
| 2020/0036897 A1* | 1/2020 | Kuo ..................... | H04N 23/6812 |
| 2020/0209515 A1* | 7/2020 | Cheng .................... | H04N 23/54 |
| 2021/0195076 A1* | 6/2021 | Chen ..................... | G01S 17/894 |
| 2022/0221625 A1* | 7/2022 | Weng ....................... | G03B 5/00 |
| 2023/0078421 A1* | 3/2023 | Han ....................... | H04N 23/57 |
| | | | 348/135 |
| 2024/0406524 A1* | 12/2024 | Lee ....................... | G03B 30/00 |

* cited by examiner

*Primary Examiner* — Paul C Lee
(74) *Attorney, Agent, or Firm* — ScienBiziP, P.C.

(57) ABSTRACT

An imaging device includes a housing, a cover, a supporting plate, a filter assembly, a driving mechanism, and an imaging mechanism. The housing and the cover cooperate to define a mounting cavity. The supporting plate divides the mounting cavity into a first portion and a second portion in a first direction. A second light through hole is defined by the supporting plate. The filter assembly includes a first filter and a second filter in the first portion along a second direction. The driving mechanism extending through the supporting plate includes two driving assemblies respectively connected to the first and second filters, the driving assemblies are configured to drive the first or second filter to cover the second light through hole, or drive the first and second filters to be located on opposite sides of the second light through hole. The imaging mechanism is received in the second portion.

20 Claims, 10 Drawing Sheets

IMAGING DEVICE COMPRISING A DRIVING MECHANISM CONNECTED TO A FILTER ASSEMBLY AND ELECTRONIC EQUIPMENT HAVING THE SAME

FIELD

The subject matter herein generally relates to a technical field of imaging, and in particular to an imaging device and an electronic equipment having the imaging device.

BACKGROUND

In the electronic devices such as mobile phones, in order to meet different shooting effects, it is necessary to install an external filter on the camera of the electronic device. One filter usually corresponds to one shooting effect. When shooting, you need to carry multiple filters for disassembly and assembly to obtain different shooting effects.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
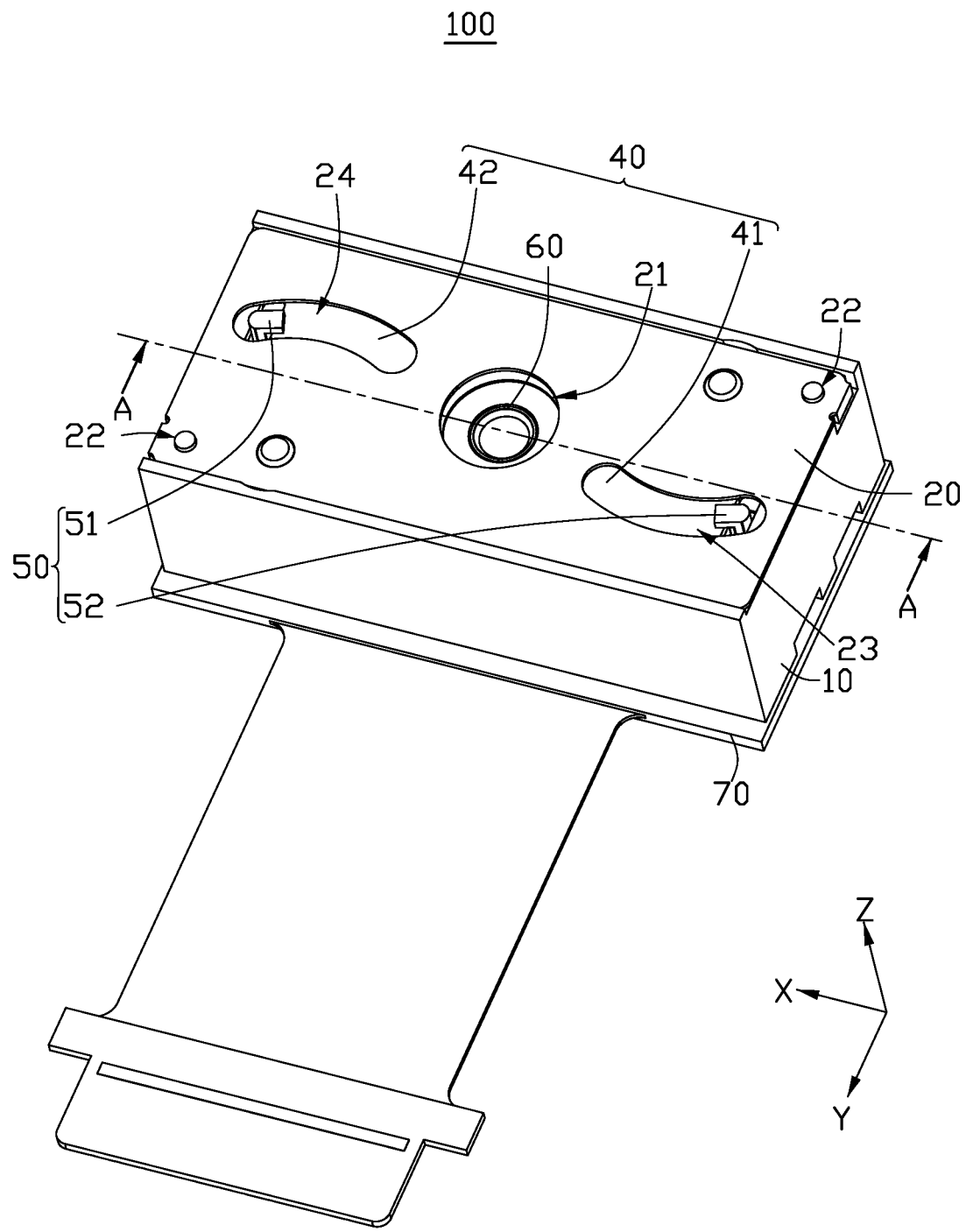
FIG. 1 is a diagram illustrating an imaging device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Figure 2:
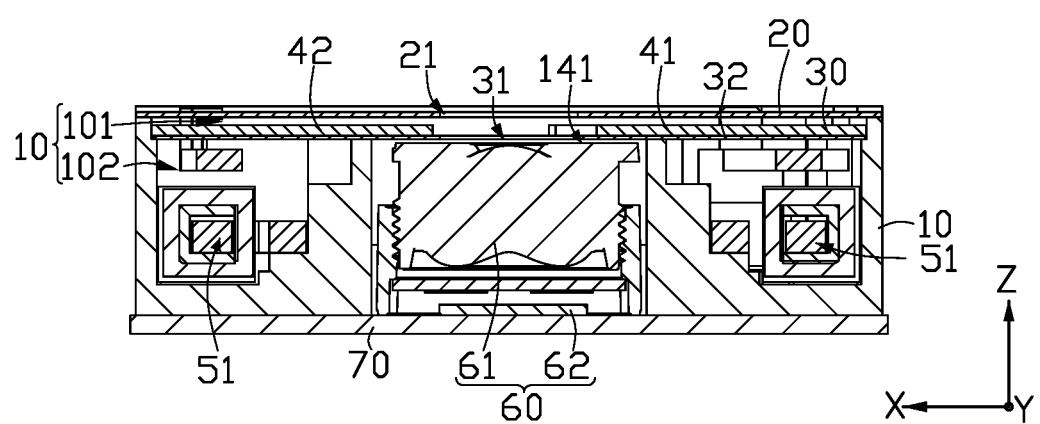
FIG. 2 is a cross-sectional view illustrating the imaging device taken along A-A line in FIG. 1.

FIG. 1 illustrates an embodiment of an imaging device 100. Referring to FIG. 1 and FIG. 2, the imaging device 100 includes a housing 10, a cover 20, a support plate 30, a filter assembly 40, a driving mechanism 50, and an imaging mechanism 60. The cover 20 and the housing are stacked and connected along a first direction Z. A mounting cavity 10a is defined by the housing 10 and the cover 20. A first light through hole 21 communicating with the mounting cavity 10a penetrates the cover 20 along the first direction Z.

The supporting plate 30 is connected to the housing 10 and divides the mounting cavity 10a into a first portion 101 and a second portion 102 in the first direction Z. The first portion 101 is located on a side of the supporting plate 30 facing the cover 20, and the second portion 102 is located on a side of the supporting plate 30 facing away from the cover 20. A second light through hole 31 corresponding to the first light through hole 21 penetrates the supporting plate 30 along the first direction Z, so that optical signal can pass through the first light through hole 21 and the second light through hole 31 in sequence. In at least one embodiment, along the first direction Z, a projection of the second light through hole 31 and a projection of the first light through hole 21 may be coincident.

The filter assembly 40 includes a first filter 41 and a second filter 42. The first filter 41 and the second filter 42 are arranged in the first portion 101 along a second direction X, and the first filter 41 and the second filter 42 are movable along the second direction X. The second direction X is perpendicular to the first direction Z.

The first filter 41 and the second filter 42 have different filtering effects. In at least one embodiment, the first filter 41 may be a polarizing filter used to eliminate reflected light, increase saturation, and improve contrast, thereby producing a sharp shooting effect. The second filter 42 may be a starlight filter used to diffract light beams from a plurality of angles at a light source to produce a starburst shooting effect.

In at least one embodiment, the first filter 41 or the second filter 42 may be any one of a neutral density filter, a black pro-mist filter, a graduated filter, a color filter, an ultraviolet filter, and a depth of field filter.

Figure 3:
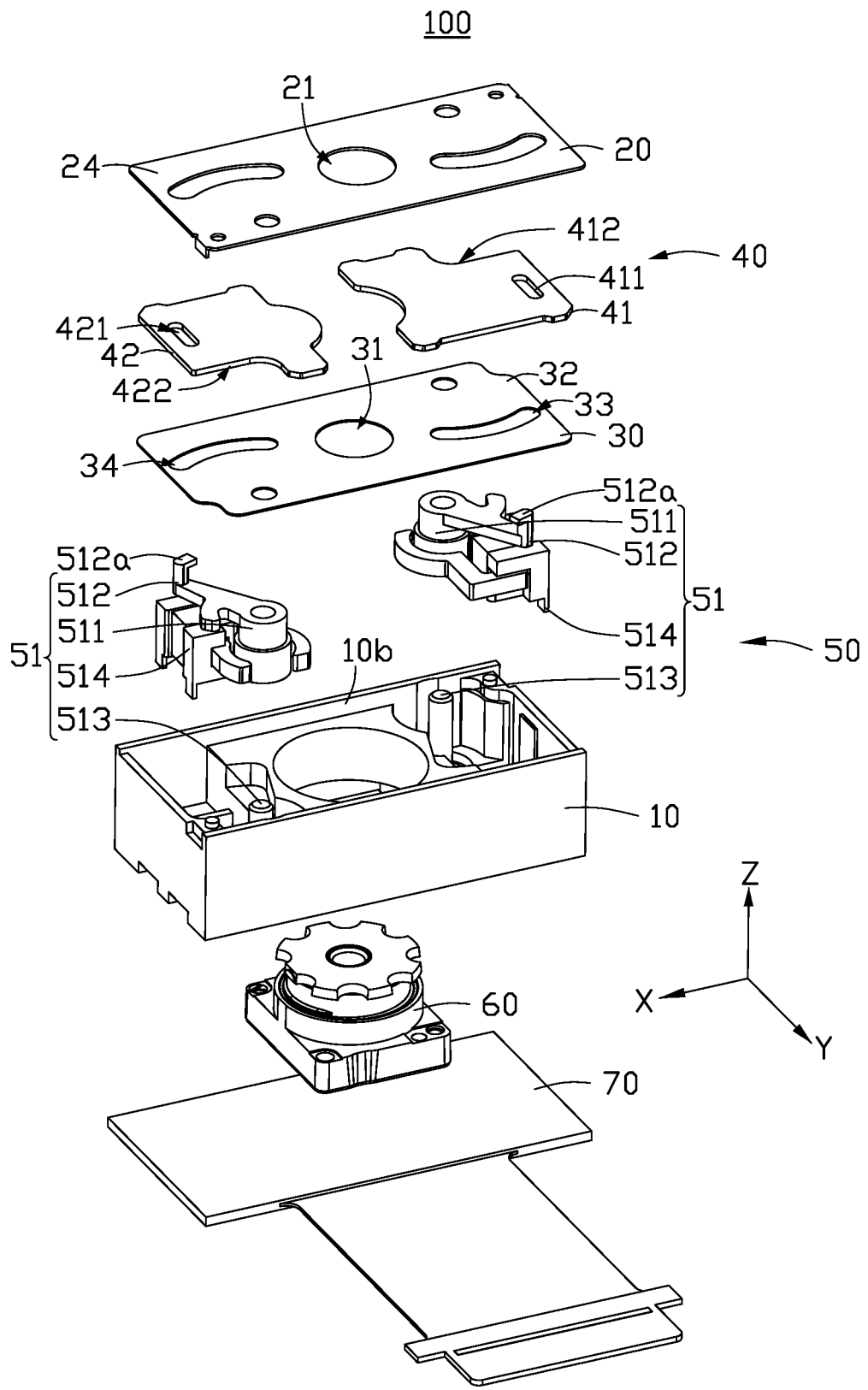
FIG. 3 is an exploded view illustrating an imaging device according to an embodiment of the present disclosure.
Figure 4:
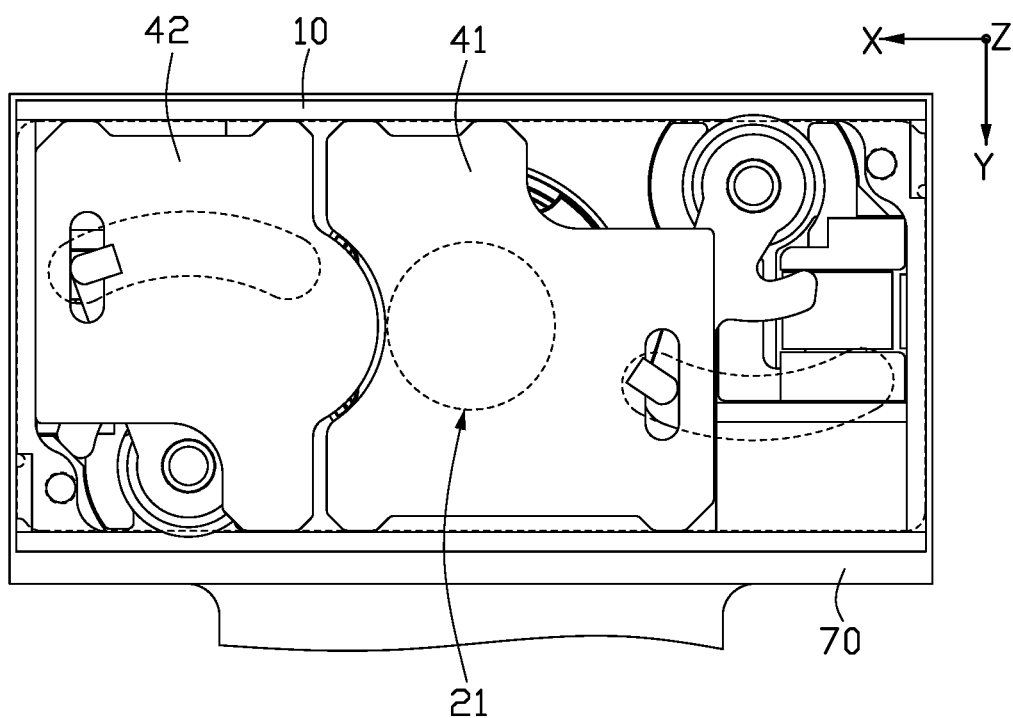
FIG. 4 a planar view illustrating a part of an imaging device in a first state according to an embodiment of the present disclosure.
Figure 5:
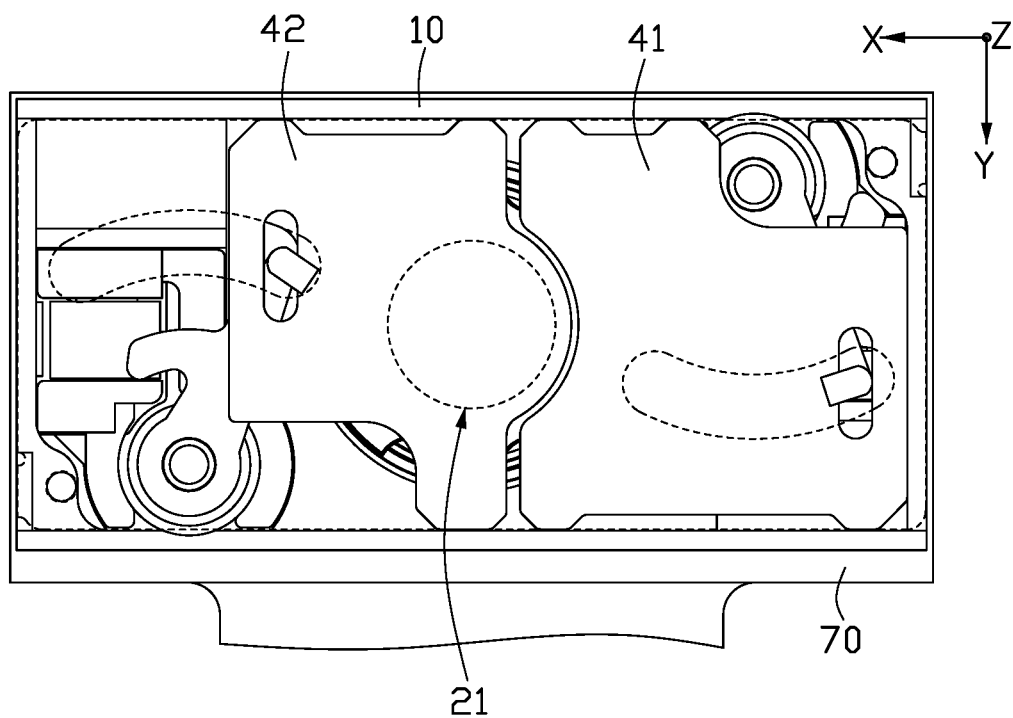
FIG. 5 is a planar view illustrating a part of an imaging device in a second state according to an embodiment of the present disclosure.

Referring to FIGS. 1 to 3, the driving mechanism 50 includes two driving assemblies 51. Each of the driving assemblies 51 extends through the supporting plate 30 from the second portion 102 to the first portion 101. One of the driving assemblies 51 is drivingly connected to the first filter 41, and another one of the driving assemblies 51 is drivingly connected to the second filter 42. The driving assemblies 51 are used to drive one of the first filter 41 and the second filter 42 to cover the second light through hole 31, or drive the first filter 41 and the second filter 42 to be located on opposite sides of the second light through hole 31 along the second direction X to expose the second light through hole 31 from the first filter 41 and the second filter 42.

Referring to FIGS. 1 to 5, in at least one embodiment, one of the driving assemblies 51 is used to drive the first filter 41 to switch between a first filtering position and a first avoidance position, and another one of the driving assemblies 51 is used to drive the second filter 42 to switch between a second filtering position and a second avoidance position. When the first filter 41 covers the second light through hole 31, the first filter 41 is in the first filtering position, and the second filter 42 is in the second avoidance position. When the second filter 42 covers the second light through hole 31, the second filter 42 is in second filtering position, and the first filter 41 is in the first avoidance position.

Figure 6:
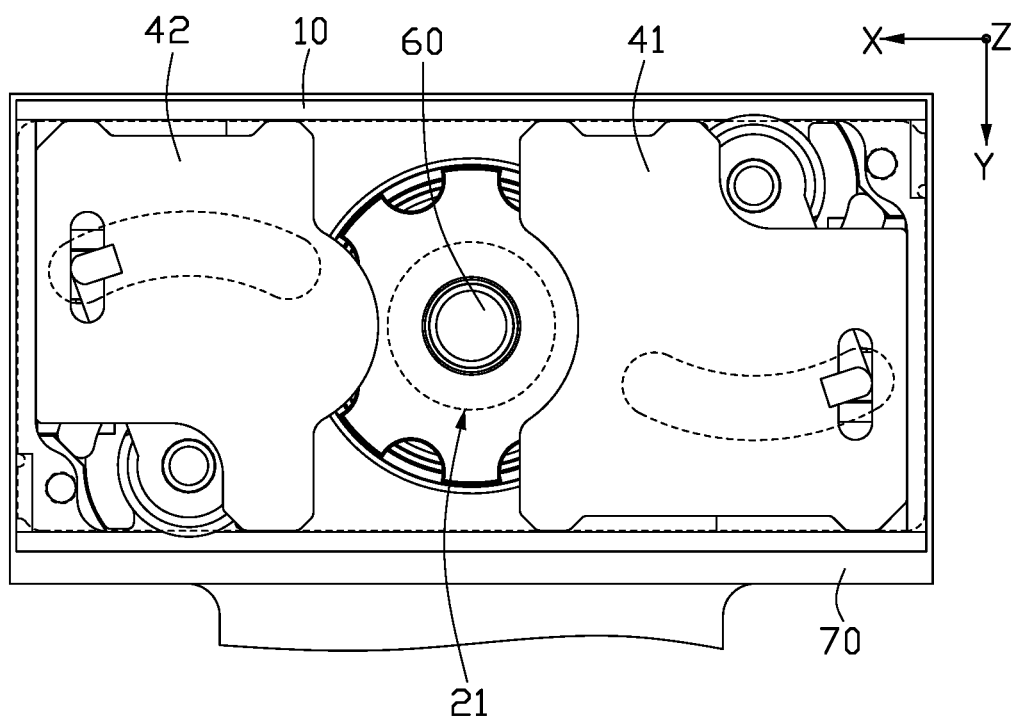
FIG. 6 is a planar view illustrating a part of an imaging device in a third state according to an embodiment of the present disclosure.

Referring to the FIG. 6, when the first filter 41 and the second filter 42 are located on opposite sides of the second light through hole 31 along the second direction X, the first filter 41 is in the first avoidance position, and the second filter 42 is in the second avoidance position.

Referring to FIGS. 1 and 2, the imaging mechanism 60 is received in the second portion 102. The imaging mechanism 60 is configured to collect optical signals that pass through the first light through hole 21 and the second light through hole 31 in sequence and generate an image. In at least one embodiment, when one of the first filter 41 and the second filter 42 covers the second light through hole 31, the imaging mechanism 60 collects optical signals that pass through the first filter 41 or the second filter 42 and generates an image corresponding to the shooting effect of the first filter 41 or the shooting effect of the second filter 42. When neither the first filter 41 nor the second filter 42 covers the second light through hole 31, the imaging mechanism 60 collects unprocessed optical signals to generate an original image.

The above imaging device 100 makes full use of the volume within the mounting cavity 10a to integrate an image function and a filter switching function, thereby improving an integration level of the imaging device 100.

Figure 7:
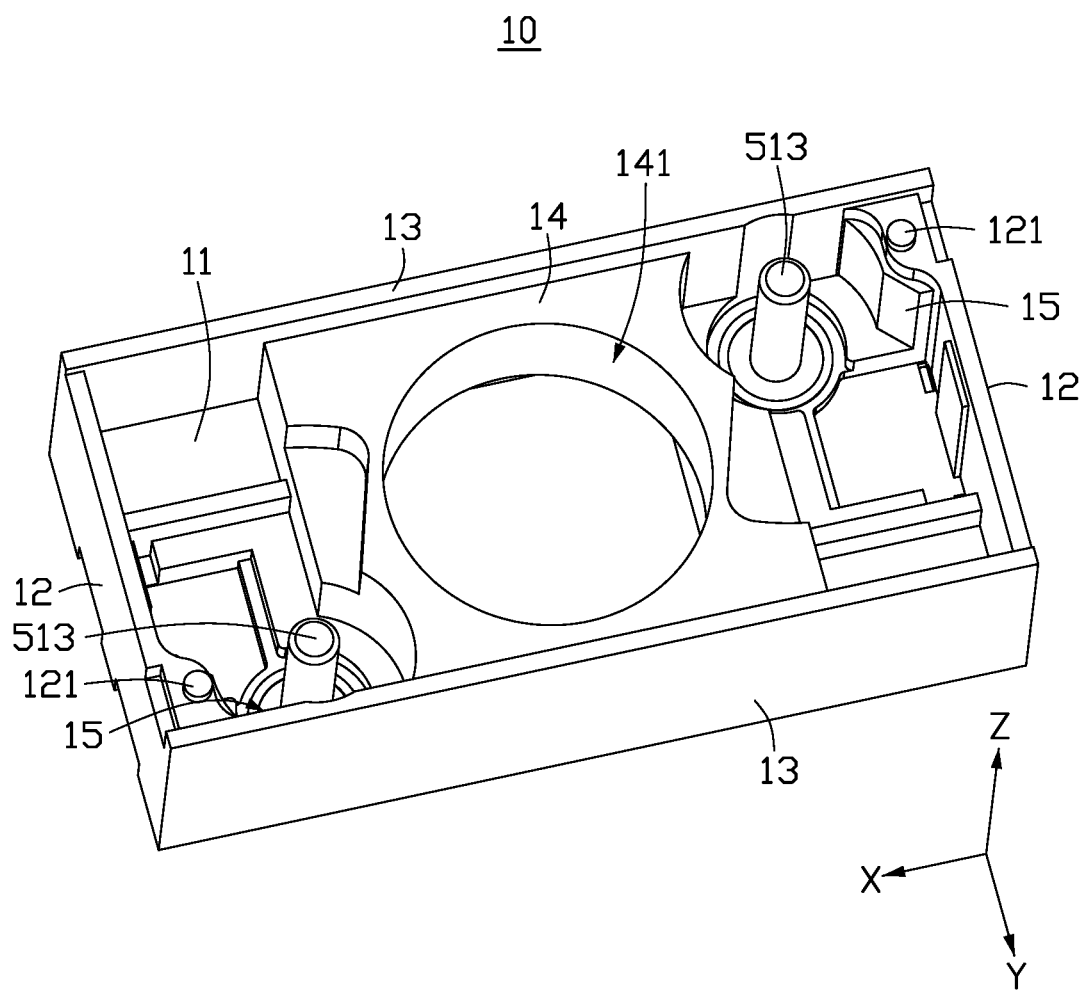
FIG. 7 is a diagram illustrating a housing according to an embodiment of the present disclosure.

Referring to FIGS. 3 and 7, in at least one embodiment, the housing 10 includes a bottom plate 11, two first side plates 12, and two second side plates 13. Each of the first side plates 12 and the second side plates 13 is connected to the bottom plate 11. The bottom plate 11 and the cover 20 are arranged at intervals along the first direction Z. The first side plates 12 are arranged at intervals along the second direction X. the second side plates 13 are arranged at intervals along a third direction Y. The third direction Y is different from the first direction Z and the second direction X. In at least one embodiment, the third direction Y may be perpendicular to the first direction Z and the second direction X. One of the first side plates 12, one of the second side plates 13, another one of the first side plates 12, and another one of the second side plates 13 are connected end to end in sequence.

In at least one embodiment, referring to FIGS. 2, 3, and 7, an end surface of each of the first side plates 12 facing away from the bottom plate 11 may abut against the cover 20 along the first direction Z, an end portion of each of the second side plates 13 facing away from the bottom plate 11 may protrude from the end surface of each of the first side plates 12 along the first direction Z, and the cover 20 may abut between the second side plates 13 along the third direction Y, thereby improving a stability of a connection between the cover 20 and the housing 10.

In at least one embodiment, the end surface of each of the first side plates 12 facing away from the bottom plate 11 may be provided with a positioning pin 121, and the covers 20 may define positioning holes 22. The positioning pin 121 is inserted into one of the positioning holes 22 to limit the connection between the cover 20 and the housing 10, so that the stability of the connection between the cover 20 and the housing 10 can be further improved.

In at least one embodiment, the housing 10 may further include a bearing portion 14. The bearing portion 14 protrudes from the bottom plate 11 along the first direction Z toward the cover 20. A mounting groove 141 is recessed inwardly from a surface of the bearing portion 14 facing away from the bottom plate 11. The imaging mechanism 60 is received in the mounting groove 14 to improve a stability of the imaging mechanism 60 being arranged in the second portion 102. The surface of the bearing portion 14 facing away from the bottom plate 11 is used to support and connect the supporting plate 30 to improve a stability of a connection between the supporting plate 30 and the housing 10.

In at least one embodiment, the housing 10 may further include a plurality of protrusions 15. Each of the plurality of protrusions 15 is connected to a junction of one of the first side plates 12 and one of the second side plates 13. Each of the plurality of protrusions 15 protrudes from the bottom plate 11 along the first direction Z toward the cover 20. A surface of each of the plurality of protrusions 15 facing away from the bottom plate 11 is flush with the surface of the bearing portion 14 facing away from the bottom plate 11 to support the supporting plate 30, thereby improving the stability of the connection between the supporting plate 30 and the housing 10.

Figure 8:
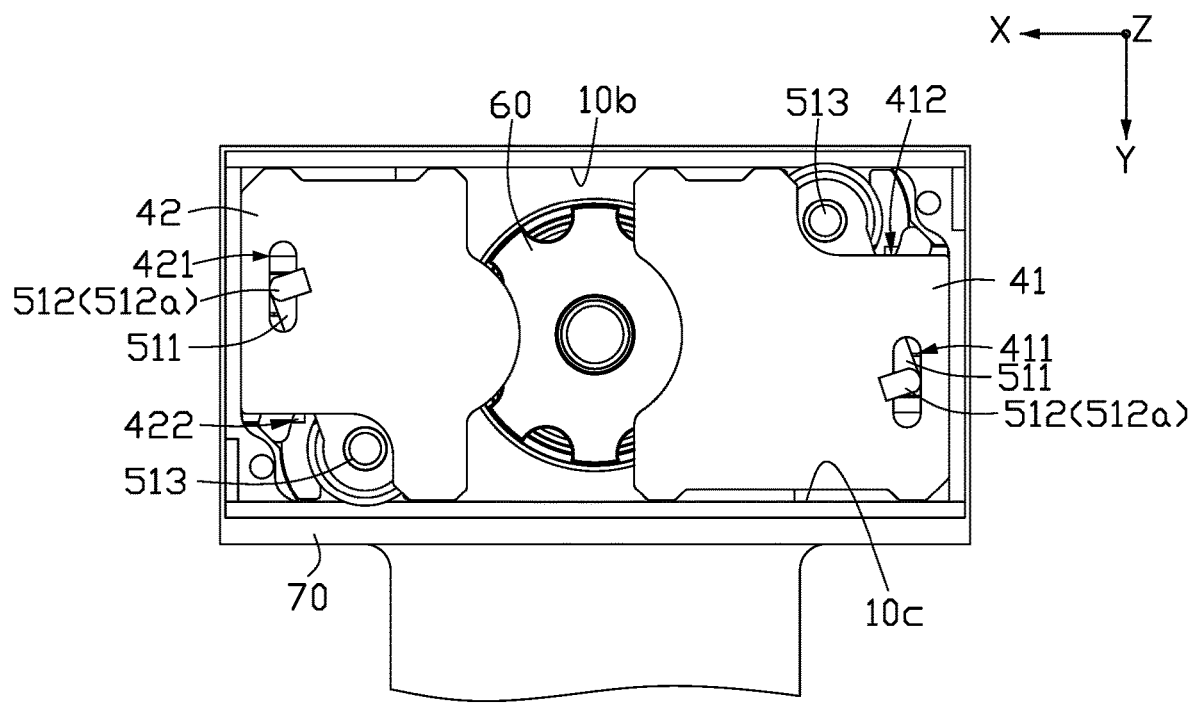
FIG. 8 is a planar view illustrating another part of an imaging device according to an embodiment of the present disclosure.

Referring to FIGS. 3 and 8, in at least one embodiment, a sliding surface 32 of the supporting plate 30 facing the cover 20 may be perpendicular to the first direction Z. The first filter 41 and the second filter 42 are respectively slidably connected to the sliding surface 32 to improve a stability of a movement of the first filter 41 and the second filter 42.

In at least one embodiment, the housing 10 may further include a first inner side surface 10b and a second inner side surface 10c configured for defining the first portion 101. The first inner side surface 10b and the second inner side surface 10c respectively extend along the second direction X and parallel to each other. In at least one embodiment, the first inner side surface 10b is formed on a side of one of the second side plates 13 facing the first portion 101, and the second inner side surface 10c is formed on a side of another one of the second side plates 13 facing the first portion 101. Opposite ends of the first filter 41 are respectively in contact with the first inner side surface 10b and the second inner side surface 10c, and/or opposite ends of the second filter 42 are respectively in contact with the first inner side surface 10b and the second inner side surface 10c, thereby improving a stability of a movement of the first filter 41 and the second filter 42 along the second direction X.

In at least one embodiment, the first inner side surface 10b and the second inner side surface 10c may respectively define sliding grooves (not shown) extending along the second direction X. The opposite ends of the first filter 41 are respectively slidably connected to the sliding grooves, and/or the opposite ends of the second filter 42 are respectively slidably connected to the sliding grooves.

In at least one embodiment, a first hole 411 is recessed inwardly from a surface of the first filter 41 facing the bottom plate 11, and a second hole 421 is recessed inwardly from a surface of the second filter 42 facing the bottom plate 11. The first hole 411 and the second hole 421 are slot holes and extend along the third direction Y respectively.

Each of the driving assemblies 51 includes a rotating rod 511 and a linkage pin 512. The rotating rod 511 is rotatably arranged in the second portion 102. The linkage pin 512 is connected to the rotating rod 511 and extends through the supporting plate 30 and is inserted into the first hole 411 or the second hole 421. When the rotating rod 511 rotates, the linkage pin 512 is driven to have a movement in the second direction X and a movement in the third direction Y.

Taking the driving assembly 51 that is drivingly connected to the first filter 41 as an example, the linkage pin 512 abuts against an inner surface defining the first hole 411, so that the movement of the linkage pin 512 in the second direction X can drive the first filter 41 to move along the second direction X. The movement of the linkage pin 512 in the third direction Y matches an extending length of the first hole 411 along the third direction Y.

Taking the driving assembly 51 that is drivingly connected to the second filter 42 as an example, the linkage pin 512 abuts against an inner surface defining the second hole 421, so that the movement of the linkage pin 512 in the second direction X can drive the second filter 42 to move along the second direction X. The movement of the linkage pin 512 in the third direction Y matches an extending length of the second hole 421 along the third direction Y.

Referring to FIG. 3, in at least one embodiment, the supporting 30 includes a first limiting hole 33 and a second limiting hole 34. A shape of the first limiting hole 33 may match a movement trajectory of the linkage pin 512 inserted into the first hole 411, and a shape of the second limiting hole 34 may match a movement trajectory of the linkage pin 512 inserted into the second hole 421. That is, the shape of the first limiting hole 33 may be the same as the movement trajectory of the linkage pin 512 inserted into the first hole 411, the shape of the second limiting hole 34 may be the same as the movement trajectory of the linkage pin 512 inserted into the second hole 421. So that a stability of a movement of the linkage pins 512 can be improved, thereby improving the stability of the movement of the first filter 41 and the second filter 42 along the second direction X.

In at least one embodiment, the cover 20 includes a third limiting hole 23 and a fourth limiting hole 24. Along the first direction Z, a projection of the third limiting hole 23 overlaps with a projection of the first limiting hole 33, and an end of the linkage pin 512 extending through the first hole 411 is received in the third limiting hole 23, so that the stability of the movement of the linkage pin 512 extending through the first hole 411 can be further improved. Along the first direction Z, a projection of the fourth limiting hole 24 overlaps with a projection of the second limiting hole 34, and an end of the linkage pin 512 extending through the second hole 421 is received in the fourth limiting hole 24, so that the stability of the movement of the linkage pin 512 extending through the second hole 421 can be further improved.

Referring to FIGS. 3 and 8, in at least one embodiment, the end of the linkage pin 512 may include a stopper 512a. Taking the driving assembly 51 that is drivingly connected to the first filter 41 as an example, along the first direction Z, a projection of the stopper 512a and a projection of the first filter 41 overlap to reduce a risk of the first filter 41 being detached from the linkage pin 512. Taking the driving assembly 51 that is drivingly connected to the second filter 42 as an example, along the first direction Z, a projection of the stopper 512a and a projection of the second filter 42 overlap to reduce a risk of the second filter 42 being detached from the linkage pin 512.

Figure 9:
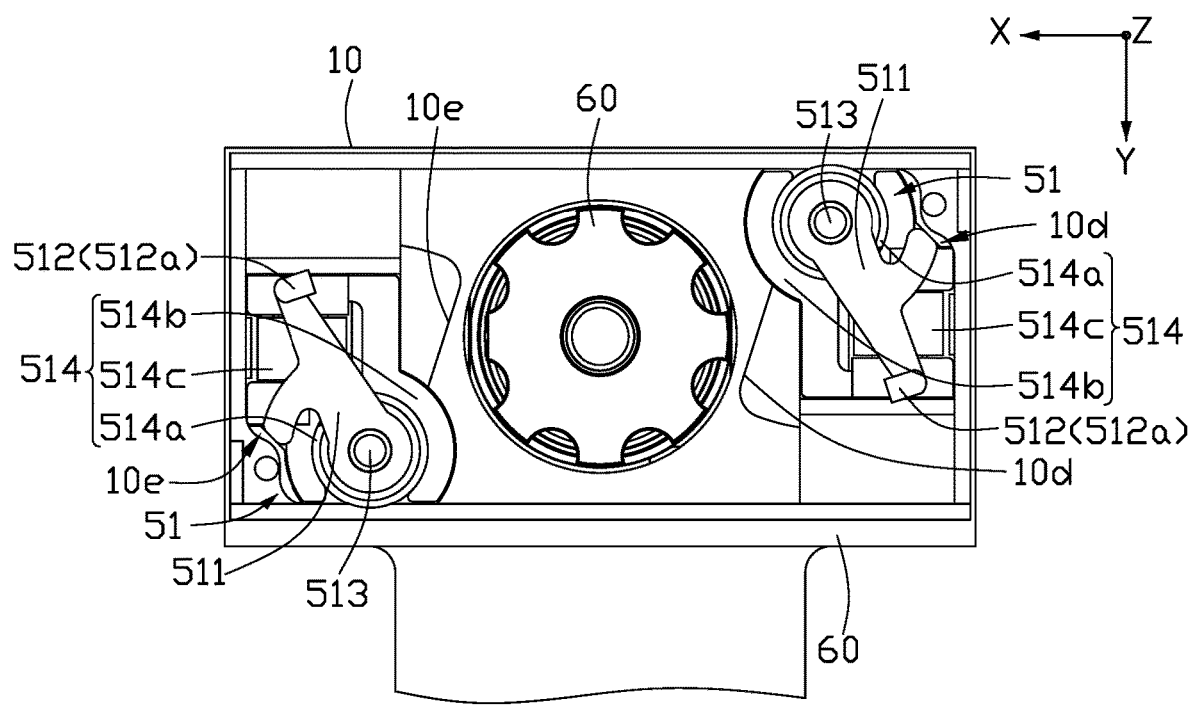
FIG. 9 is a planar view illustrating yet another part of an imaging device according to an embodiment of the present disclosure.

Referring to FIGS. 3, 7, and 9, in at least one embodiment, the rotating rods 511 of the driving assemblies 51 may be located on opposite sides of the imaging mechanism 60 along the second direction X to improve a space utilization of the second portion 102, which is beneficial to improve an integration of the imaging device 100. In at least one embodiment, the rotating rod 511 of one of the driving assemblies 51 may be adjacent to one of the second side plates 13, and the rotating rod 511 of another one of the driving assemblies 51 may be adjacent to another one of the second side plates 13, which is beneficial to improve a space utilization of the second portion 102 and improve an integration of the imaging device 100.

In at least one embodiment, each of the driving assemblies 51 may further include a positioning rod 513 and a magnetic driving member 514. The positioning rod 513 is connected to the housing 10, and the positioning rod 513 penetrates the supporting plate 30, the first portion 101 and the cover 20 in sequence from the second portion 102 along the first direction Z, thereby improving a connection stability of the housing 10, the cover 20, and the supporting plate 30. Correspondingly, the first filter 41 includes a first avoidance opening 412 for passing the positioning rod 513 of one of the driving assemblies 51, and the second filter 42 includes a second avoidance opening 422 for passing the positioning rod 513 of another one of the driving assemblies 51.

In each of the driving assemblies 51, one end of the rotating rod 511 is rotatably connected to the positioning rod 513, another one end of the rotating rod 511 is connected to the linkage pin 512, the magnetic driving member 514 is drivingly connected to the rotating rod 511 and is used to drive the rotating rod 511 to rotate around the positioning rod 513.

Referring to FIG. 9, in at least one embodiment, the magnetic driving member 514 may include a magnet 514a, a yoke 514b, and a coil 514c. The magnet 514a is connected to the rotating rod 511. A first end portion of the yoke 514b includes a first excitation part (not labeled) and a second excitation part (not labeled). The first excitation part and the second excitation part are symmetrical and extend in a bend. The magnet 514a is located between the first excitation part and the second excitation part. The coil 514c is wound around a second end portion of the yoke 514b. The magnet 514a is controlled to rotate clockwise or counterclockwise by controlling the direction of the current in the coil 514c, thereby driving the rotating rod 511 to rotate clockwise or counterclockwise.

In at least one embodiment, viewed along the first direction Z, the bottom plate 11 may be rectangular.

In at least one embodiment, the housing 10 may further include two first stopping surfaces 10d and two second stopping surfaces 10e configured for defining the second portion 102. The first stopping surfaces 10d are respectively located on opposite sides of the rotating rod 511 of one of the driving assemblies 51, and the second stopping surfaces 10e are respectively located on opposite sides of the rotating rod 511 of another one of the driving assemblies 51, so that a rotation stroke of the rotating rod 511 of each of the driving assemblies 51 is limited. In at least one embodiment, one of the first stopping surfaces 10d may be formed on the bearing portion 14, and another one may be formed on one of the plurality of protrusions 15. One of the second stopping surfaces 10e may be formed on the bearing portion 14, and another one may be formed on another one of the plurality of protrusions 15.

In at least one embodiment, the magnetic driving member 514 may include a cylinder and a motor.

Referring to FIGS. 1 and 3, in at least one embodiment, the imaging mechanism 60 includes a lens assembly 61 and a photosensitive chip 62. The lens assembly 61 is received in the mounting groove 141 of the bearing portion 14. The photosensitive chip 62 is located on a side of the lens assembly 61 facing away from the second light through hole 31. The lens assembly 61 is used to collect optical signals that pass through the first light through hole 21 and the second light through hole 31 in sequence. The photosensitive chip 62 is used to convert the optical signal into an electrical signal and generate an image.

In at least one embodiment, the photosensitive chip 62 may be a metal oxide semiconductor (CMOS) sensor or a charge coupled device (CCD) sensor.

Referring to FIGS. 1 to 3, in at least one embodiment, the imaging device 100 may further include a circuit board 70. The circuit board 70 is located on a side of the housing 10 facing away from the cover 20. A surface of the housing 10 facing away from the cover 20 defines a plurality of the openings 103 for passing the imaging mechanism 60 and the driving mechanism 50. The imaging mechanism 60 and the driving mechanism 50 are respectively electrically connected to the circuit board 70, and the circuit board 70 is used to provide power the imaging mechanism 60 and the driving mechanism 50.

The photosensitive chip 62 is connected to the circuit board 70. The circuit board 70 is used to provide power the photosensitive chip 62 and control the direction of current in coil 514*c*.

Figure 10:
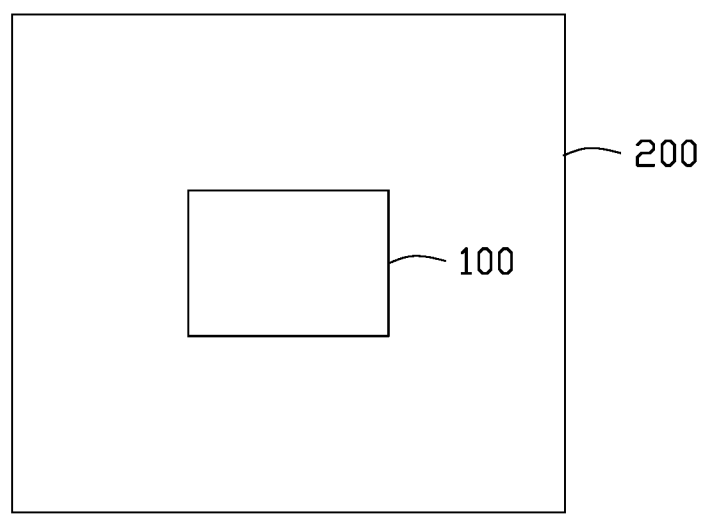
FIG. 10 is a diagram illustrating an electronic equipment according to an embodiment of the present disclosure.

FIG. 10 illustrates a first embodiment of an electronic equipment 200 having the imaging device 100. The electronic equipment 200 may be, but not limited to, a mobile phone, a portable device, a notebook computer, or a drone.

In the above imaging device 100 and the above electronic equipment 200, the supporting plate 10 is connected to the housing 10 and divides the mounting cavity 10*a* into the first portion 101 and the second portion 102 in the first direction Z. The first filter 41 and the second filter 42 are arranged in the first portion 101 along a second direction X. The imaging mechanism 60 is received in the second portion 102. Each of the driving assemblies 51 extends through the supporting plate 30 from the second portion 102 to the first portion 101. One of the driving assemblies 51 is drivingly connected to the first filter 41, and another one of the driving assemblies 51 is drivingly connected to the second filter 42. The driving assemblies 51 are used to drive one of the first filter 41 and the second filter 42 to cover the second light through hole 31, or drive the first filter 41 and the second filter 42 to be located on opposite sides of the second light through hole 31 along the second direction X to expose the second light through hole 31 from the first filter 41 and the second filter 42. The imaging device 100 makes full use of the volume within the mounting cavity 10*a* to integrate an image function and a filter switching function, thereby improving an integration level of the imaging device 100.

It is to be understood, even though information and advantages of the present embodiments have been set forth in the foregoing description, together with details of the structures and functions of the present embodiments, the disclosure is illustrative only, changes may be made in detail, especially in matters of shape, size, and arrangement of parts within the principles of the present embodiments to the full extent indicated by the plain meaning of the terms in which the appended claims are expressed.

What is claimed is:

1. An imaging device comprising:
 a housing;
 a cover, wherein the cover and the housing cooperate with each other to define a mounting cavity, and a first light through hole communicating with the mounting cavity penetrates the cover along a first direction;
 a supporting plate connected to the housing and dividing the mounting cavity into a first portion and a second portion in the first direction, wherein the first portion is located on a side of the supporting plate facing the cover, the second portion is located on a side of the supporting plate facing away from the cover, and a second light through hole corresponding to the first light through hole penetrates the supporting plate along the first direction;
 a filter assembly comprising a first filter and a second filter, wherein the first filter and the second filter are arranged in the first portion along a second direction perpendicular to the first direction;
 a driving mechanism comprising two driving assemblies, wherein each of the two driving assemblies extends through the supporting plate from the second portion to the first portion, one of the two driving assemblies is drivingly connected to the first filter, and another one of the two driving assemblies is drivingly connected to the second filter, the two driving assemblies are configured to drive one of the first filter and the second filter to cover the second light through hole, or drive the first filter and the second filter to be located on opposite sides of the second light through hole along the second direction; and
 an imaging mechanism received in the second portion and configured to collect optical signals that pass through the first light through hole and the second light through hole in sequence and generate an image.

2. The imaging device of claim 1, wherein the supporting plate comprises a sliding surface facing the cover, the sliding surface is perpendicular to the first direction, the first filter and the second filter are respectively slidably connected to the sliding surface.

3. The imaging device of claim 2, wherein the housing comprises a first inner side surface and a second inner side surface configured for defining the first portion, the first inner side surface and the second inner side surface respectively extend along the second direction and parallel to each other, opposite ends of the first filter are respectively in contact with the first inner side surface and the second inner side surface, and/or opposite ends of the second filter are respectively in contact with the first inner side surface and the second inner side surface.

4. The imaging device of claim 2, wherein a first hole is recessed inwardly from a surface of the first filter facing away from the cover, and a second hole is recessed inwardly from a surface of the second filter facing away from the cover, the first hole and the second hole are slot holes and extend along a third direction respectively, the third direction is perpendicular to the first direction and the second direction, and
 each of the two driving assemblies comprises a rotating rod and a linkage pin, the rotating rod is rotatably arranged in the second portion, the linkage pin is connected to the rotating rod, the linkage pin extends through the supporting plate along the first direction and is inserted into the first hole or the second hole.

5. The imaging device of claim 4, wherein the supporting plate further comprises a first limiting hole and a second limiting hole, a shape of the first limiting hole matches a movement trajectory of the linkage pin inserted into the first hole, and a shape of the second limiting hole matches a movement trajectory of the linkage pin inserted into the second hole.

6. The imaging device of claim 5, wherein the cover comprises a third limiting hole and a fourth limiting hole, along the first direction, a projection of the third limiting hole overlaps with a projection of the first limiting hole, a projection of the fourth limiting hole overlaps with a projection of the second limiting hole, an end of the linkage pin extending through the first hole is received in the third limiting hole, and an end of the linkage pin extending through the second hole is received in the fourth limiting hole.

7. The imaging device of claim 6, wherein the end of the linkage pin comprises a stopper, along the first direction, a projection of the stopper of the linkage pin extending through the first hole overlaps with a projection of the first filter, and a projection of the stopper of the linkage pin extending through the second hole overlaps with a projection of the second filter.

8. The imaging device of claim 4, wherein the rotating rods of the two driving assemblies are located on opposite sides of the imaging mechanism along the second direction.

9. The imaging device of claim 4, wherein each of the two driving assemblies further comprises a positioning rod and a magnetic driving member, the positioning rod is connected to the housing, the positioning rod penetrates the supporting plate, the first portion, and the cover in sequence from the second portion along the first direction, one end of the rotating rod is rotatably connected to the positioning rod, another one end of the rotating rod is connected to the linkage pin, the magnetic driving member is received in the second portion, the magnetic driving member is drivingly connected to the rotating rod, and the magnetic driving member is configured to drive the rotating rod to rotate around the positioning rod.

10. The imaging device of claim 1, further comprising a circuit board, wherein the circuit board is located on a side of the housing facing away from the cover, a surface of the housing facing away from the cover defines a plurality of the openings for passing the imaging mechanism and the driving mechanism, the imaging mechanism and the driving mechanism are respectively electrically connected to the circuit board.

11. An electronic equipment comprising:
   an imaging device comprising:
      a housing;
      a cover, wherein the cover and the housing cooperate with each other to define a mounting cavity, and a first light through hole communicating with the mounting cavity penetrates the cover along a first direction;
      a supporting plate connected to the housing and dividing the mounting cavity into a first portion and a second portion in the first direction, wherein the first portion is located on a side of the supporting plate facing the cover, the second portion is located on a side of the supporting plate facing away from the cover, and a second light through hole corresponding to the first light through hole penetrates the supporting plate along the first direction;
      a filter assembly comprising a first filter and a second filter, wherein the first filter and the second filter are arranged in the first portion along a second direction perpendicular to the first direction;
      a driving mechanism comprising two driving assemblies, wherein each of the two driving assemblies extends through the supporting plate from the second portion to the first portion, one of the two driving assemblies is drivingly connected to the first filter, and another one of the two driving assemblies is drivingly connected to the second filter, the two driving assemblies are configured to drive one of the first filter and the second filter to cover the second light through hole, or drive the first filter and the second filter to be located on opposite sides of the second light through hole along the second direction; and
      an imaging mechanism received in the second portion and configured to collect optical signals that pass through the first light through hole and the second light through hole in sequence and generate an image.

12. The electronic equipment of claim 11, wherein the supporting plate comprises a sliding surface facing the cover, the sliding surface is perpendicular to the first direction, the first filter and the second filter are respectively slidably connected to the sliding surface.

13. The electronic equipment of claim 12, wherein the housing comprises a first inner side surface and a second inner side surface configured for defining the first portion, the first inner side surface and the second inner side surface respectively extend along the second direction and parallel to each other, opposite ends of the first filter are respectively in contact with the first inner side surface and the second inner side surface, and/or opposite ends of the second filter are respectively in contact with the first inner side surface and the second inner side surface.

14. The electronic equipment of claim 12, wherein a first hole is recessed inwardly from a surface of the first filter facing away from the cover, and a second hole is recessed inwardly from a surface of the second filter facing away from the cover, the first hole and the second hole are slot holes and extend along a third direction respectively, the third direction is perpendicular to the first direction and the second direction, and
   each of the two driving assemblies comprises a rotating rod and a linkage pin, the rotating rod is rotatably arranged in the second portion, the linkage pin is connected to the rotating rod, the linkage pin extends through the supporting plate along the first direction and is inserted into the first hole or the second hole.

15. The electronic equipment of claim 14, wherein the supporting plate further comprises a first limiting hole and a second limiting hole, a shape of the first limiting hole matches a movement trajectory of the linkage pin inserted into the first hole, and a shape of the second limiting hole matches a movement trajectory of the linkage pin inserted into the second hole.

16. The electronic equipment of claim 15, wherein the cover comprises a third limiting hole and a fourth limiting hole, along the first direction, a projection of the third limiting hole overlaps with a projection of the first limiting hole, a projection of the fourth limiting hole overlaps with a projection of the second limiting hole, an end of the linkage pin extending through the first hole is received in the third limiting hole, and an end of the linkage pin extending through the second hole is received in the fourth limiting hole.

17. The electronic equipment of claim 16, wherein the end of the linkage pin comprises a stopper, along the first direction, a projection of the stopper of the linkage pin extending through the first hole overlaps with a projection of the first filter, and a projection of the stopper of the linkage pin extending through the second hole overlaps with a projection of the second filter.

18. The electronic equipment of claim 14, wherein the rotating rods of the two driving assemblies are located on opposite sides of the imaging mechanism along the second direction.

19. The electronic equipment of claim 14, wherein each of the two driving assemblies further comprises a positioning rod and a magnetic driving member, the positioning rod is connected to the housing, the positioning rod penetrates the supporting plate, the first portion, and the cover in sequence from the second portion along the first direction, one end of the rotating rod is rotatably connected to the positioning rod, another one end of the rotating rod is connected to the linkage pin, the magnetic driving member is received in the second portion, the magnetic driving member is drivingly connected to the rotating rod, and the magnetic driving member is configured to drive the rotating rod to rotate around the positioning rod.

20. The electronic equipment of claim 11, further comprising a circuit board, wherein the circuit board is located on a side of the housing facing away from the cover, a surface of the housing facing away from the cover defines a plurality of the openings for passing the imaging mechanism and the driving mechanism, the imaging mechanism and the driving mechanism are respectively electrically connected to the circuit board.

* * * * *